United States Patent

Kaylo et al.

[11] Patent Number: 6,132,581
[45] Date of Patent: Oct. 17, 2000

[54] ELECTROCOATING COMPOSITIONS CONTAINING POLYVINYLPYRROLIDONE CRATER CONTROL AGENTS

[75] Inventors: Alan J. Kaylo, Glenshaw; Thor G. Lingenfelter, Evans City, both of Pa.

[73] Assignee: PPG Industries Ohio, Inc., Cleveland, Ohio

[21] Appl. No.: 09/298,101

[22] Filed: Apr. 22, 1999

[51] Int. Cl.⁷ .................................................. C25D 13/00
[52] U.S. Cl. ........................ 204/489; 204/493; 204/500; 524/502; 524/543
[58] Field of Search .................... 204/489, 493, 204/500; 524/502, 543

[56] References Cited

U.S. PATENT DOCUMENTS

| | | | |
|---|---|---|---|
| 4,388,435 | 6/1983 | Loch | 524/548 |
| 4,410,657 | 10/1983 | Loch | 524/548 |
| 4,432,850 | 2/1984 | Moriarity et al. | 204/181 C |
| 4,614,683 | 9/1986 | Barsotti | 428/220 |
| 5,089,101 | 2/1992 | Hayashi et al. | 204/181.7 |
| 5,145,568 | 9/1992 | Chung et al. | 204/181.7 |
| 5,427,661 | 6/1995 | Geist et al. | 204/181.7 |
| 5,501,779 | 3/1996 | Geist et al. | 204/507 |

FOREIGN PATENT DOCUMENTS

| | | |
|---|---|---|
| 2059383 | 1/1992 | Canada . |
| 61-15974 | 6/1986 | Japan . |

*Primary Examiner*—Kishor Mayekar
*Attorney, Agent, or Firm*—William J. Uhl

[57] ABSTRACT

Disclosed are electrodepositable coating compositions containing a polymer prepared from the polymerization of an ethylenically unsaturated monomer having a heterocyclic ring containing at least one ring nitrogen atom bonded to a vinyl group or a mixture of monomers comprised of such a monomer, the compositions further including contaminants capable of forming defects in the electrodeposited coating surface. The polymer is present in an amount effective to abate formation of the surface defects caused by the contaminants. A method of electrocoating a conductive substrate using the electrodepositable coating compositions of the invention is also disclosed.

28 Claims, No Drawings

ELECTROCOATING COMPOSITIONS CONTAINING POLYVINYLPYRROLIDONE CRATER CONTROL AGENTS

FIELD OF THE INVENTION

The present invention relates to electrocoating bath compositions comprised of a resinous phase dispersed in an aqueous medium, the resinous phase containing an ionic resin and a polymer from the polymerization of an ethylenically unsaturated monomer having a heterocyclic ring containing at least one ring nitrogen atom bonded to a vinyl group, or a mixture of monomers comprising a monomer prepared from the polymerization of an ethylenically unsaturated monomer having a heterocyclic ring containing at least one ring nitrogen atom bonded to a vinyl group, and further including contaminants capable of forming defects in the electrodeposited coating surface, wherein the polymer is present in an amount effective to abate formation of defects caused by the contaminants. More particularly, this invention relates to electrocoating compositions which have improved crater resistance.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Although surface coatings of excellent quality can be achieved by means of cationic electrodeposition, a problem associated with this means of coating is the development of surface defects upon curing, particularly craters. The cause of such surface defects can be a result of the very nature of the components of the electrocoating composition, that is, causes inherent in the system. Typically, however, the cause of such surface defects is the impurities that are carried into the electrocoating bath with the workpiece. Examples of such impurities can include lubricating oil, anti-corrosion grease, joint sealing compounds and the like.

As the electrocoating composition is deposited onto the conductive substrate, the impurities are carried along with the coating composition and are deposited as well. When the coated substrate is cured, craters are formed due to incompatibility between the impurity and the resinous phase of the electrocoating composition.

The use of silicone additives such as SILWET L-7602, a silicone oil commercially available from OSi Specialties, a subsidiary of Witco Corporation, to prevent crater formation is well known in the art. Although these silicone additives are quite effective for crater control in electrocoating compositions, they also pose the serious disadvantage of intercoat adhesion failure of subsequently applied coating layers.

Japanese Patent Application J61,115,974 discloses the addition of a reaction product formed from a polyepoxide resin modified with dimeric fatty acids and a polyoxyalkylene polyamine to cationic electrocoating compositions to suppress crater formation. These products, however, can result in intercoat adhesion failure of subsequently applied primers and/or topcoats. U.S. Pat. No. 4,432,850 discloses the addition of a reaction product of a polyepoxide resin with a polyoxylene-polyamine containing primary amino groups to cationic electrocoating compositions to eliminate or minimize crater formation. However, to achieve maximum effectiveness as a crater control additive, this polyepoxide-polyoxyalkylenepolyamine resin sometimes must be added at quite high levels (i.e., 0.5 to 40 percent by weight), thereby diluting the properties of the other film-forming cationic resins which are present in the electrodepositable coating composition.

U.S. Pat. Nos. 5,427,661 and 5,501,779, both to Geist et al., disclose the addition of a homopolymer or copolymer of an alkyl vinyl ether to cationic electrocoating compositions to suppress the occurrence of craters in the deposited surface coating materials. Such alkyl vinyl ether materials provide adequate crater control while overcoming the intercoat adhesion failure observed with the above-mentioned crater control additives. However, these alkyl vinyl ether materials can impart the tendency in a coating to telegraph solvent wipe marks and negatively affect wettability of a subsequently applied primer or topcoat.

Copending patent application Ser. No. 08/986,812 filed Dec. 8, 1997, now U.S. Pat No. 6,033,545, discloses the addition to electrocoating compositions of a polysiloxane obtained from the reaction of a polysiloxane containing silicon hydride with a material containing one or more unsaturated bonds to suppress crater formation.

U.S. Pat. No. 5,089,101 to Hayashi et al. discloses cationic electrodepositable coating compositions comprised of a neutralization product or a quaternary ammonium salt of a comb-shaped copolymer of an ethylenically unsaturated monomer having a hydrocarbon chain with at least 8 carbon atoms at the molecular ends, a cationic (meth)acrylic monomer, 1-vinyl-2-pyrrolidone and an ethylenically unsaturated monomer different than those previously mentioned, a cationic epoxy resin and a pigment. The copolymer is characterized by relatively oleophilic long side-chains which are bonded indirectly to the main chain containing a hydrophilic nitrogen containing (meth)acrylic monomer. This comb-shaped structure provides a resin with excellent pigment dispersion properties and a composition with excellent weatherability and corrosion resistance.

The prior art references do not teach the use of either polyvinylpyrrolidone or vinyl pyrrolidone copolymers as components in electrodepositable coating compositions to provide improved crater control.

It would, therefore, be advantageous to provide an electrocoating compositions which suppresses or eliminates the occurrence of surface defects such as craters, without adversely affecting intercoat adhesion of primers and/or topcoats which may be subsequently applied to the deposited coating material.

SUMMARY OF THE INVENTION

In accordance with the present invention, an electrocoating bath composition comprising a resinous phase dispersed in an aqueous medium is provided. The resinous phase contains an ionic resin capable of deposition on a substrate serving as an electrode in an electrical circuit to form a coating thereon. The bath further includes contaminants capable of forming defects in a surface of the deposited coating and a polymer selected from (1) a homopolymer prepared from the polymerization of a polymerizable, ethylenically unsaturated monomer having a heterocyclic ring containing at least one ring nitrogen atom bonded to a vinyl group, and (2) a copolymer prepared from the polymerization of
   (a) a polymerizable, ethylenically unsaturated monomer having a heterocyclic ring containing at least one ring nitrogen atom bonded to a vinyl group, and
   (b) a polymerizable, ethylenically unsaturated monomer different from (a).

Provided, also, is a method of reducing surface defects in a surface of an electrodeposited coating on a substrate serving as a charged electrode in an electrical circuit comprising said electrode and an oppositely charged counter electrode, the method including the steps of (A) immersing the substrate serving as a charged electrode and a counter electrode in the aqueous electrocoating composition of the present invention as described immediately above; (B) connecting the substrate as an electrode in an electrical circuit; (C) depositing a substantially continuous film on the substrate by passing direct current between the two electrodes to cause deposition of the electrocoating composition on the substrate; (D) removing the coated substrate from the bath; and (E) baking the deposited film to provide a coating substantially free of surface defects caused by the contaminants.

Other than in the operating examples, or where otherwise indicated, all numbers expressing quantities of ingredients or reaction conditions used in the specification and claims are to be understood as modified in all instances by the term "about." As used herein, the term "polymer" is meant to refer to oligomers and both homopolymers, i.e., polymers made from a single monomer species, and copolymers, i.e., polymers made from two or more monomer species.

DETAILED DESCRIPTION OF THE INVENTION

In one preferred embodiment of the invention, the polymer is a homopolymer prepared from the polymerization of a polymerizable, ethylenically unsaturated monomer having a heterocyclic ring containing at least one ring nitrogen atom bonded to a vinyl group. Suitable monomers are those which contain a mono- or poly-nuclear heterocyclic ring containing 1 to 3, preferably 1 or 2, ring nitrogen atoms bonded to a vinyl group.

Specific examples of such monomers include vinylpyridines such as 2-vinylpyridine and 5-methyl-2-vinylpyridine; vinylimidazoles such as 1-vinylimidazole and 1-vinyl-2-methylimidazole; vinylcarbazoles such as N-vinylcarbazole; vinylquinolines such as 2-vinylquinoline; vinylpiperidines such as 3-vinylpiperidine and N-1-methyl-3-vinylpiperidine; compounds such as N-(meth)acryloylmorpholine, N-vinylcaprolactam, and N-(meth)acryloylpyrrolidine; and, as is preferred, vinyl pyrrolidones such as 1-vinyl-2-pyrrolidone and 1-vinyl-3-pyrrolidone.

In a preferred embodiment of the invention, the polymer is polyvinylpyrrolidone, preferably having a weight average molecular weight of at least 200,000, preferably from 300,000 to 2,000,000, and more preferably from 350,000 to 1,000,000 as determine by aqueous gel permeation chromatography using polyacrylic acid as a standard.

In another preferred embodiment of the invention, the polymer is a copolymer prepared from the polymerization of (a) a polymerizable, ethylenically unsaturated monomer having a heterocyclic ring containing at least one ring nitrogen atom bonded to a vinyl group such as those described immediately above, and (b) a polymerizable, ethylenically unsaturated monomer different from (a).

Preferably, the ethylenically unsaturated monomer (b) is selected from the group consisting of olefins, vinyl aromatic compounds, alkyl esters of (meth)acrylic acid and ethylenically unsaturated compounds having amide functionality.

As used herein and in the claims, by "olefin" and like terms is meant unsaturated aliphatic hydrocarbons having one or more double bonds. Examples of olefins suitable for use as the monomer (b) include propylene, 1-butene, 1,3-butadiene, isobutylene, hexadecene, and eicosene.

Examples of suitable vinyl aromatic compounds include styrene, alpha-methyl styrene, divinyl benzene, ethylvinyl benzene, t-butyl styrene and vinyl toluene.

As used herein and in the claims, by "(meth)acrylic acid" and like terms is meant both methacrylic acid and acrylic acid. Examples of suitable alkyl esters of (meth)acrylic acid include alkyl (meth)acrylates having from 1 to 20 carbon atoms in the alkyl group such as methyl (meth)acrylate, ethyl (meth)acrylate, 2-hydroxyethyl (meth)acrylate, propyl (meth)acrylate, 2-hydroxypropyl (meth)acrylate, isopropyl (meth)acrylate, butyl (meth)acrylate and the like. Aminoalkyl (meth)acrylates are also useful.

Examples of aminoalkyl (meth)acrylates include aminoalkyl (meth)acrylates containing a substituted or unsubstituted amino group in the ester moiety, and, as preferred, those represented by the following formula (I). Specific examples include dimethylaminoethyl (meth)acrylate, diethylaminoethyl (meth)acrylate, dipropylaminoethyl (meth)acrylate, and N-t-butylaminoethyl (meth)acrylate.

Ethylenically unsaturated compounds having amide functionality which are suitable for use as the monomer (b) include aminoalkyl (meth)acrylamides. The aminoalkyl (meth)acrylamides include aminoalkyl (meth)acrylamides containing a substituted or unsubstituted amino group in the amide moiety, and, as preferred, those represented by the following formula (II). Specific examples include dimethylaminopropyl(meth)acrylamide, N-hydroxyethylacrylamide, and N-dimethylaminoethanolacrylamide.

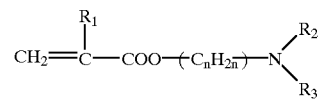

(I)

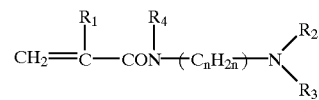

(II)

where $R_1$ is H or a methyl group, $R_2$, $R_3$, and $R_4$ each independently represent H or a lower alkyl group, and n is an integer of 2 to 8.

Other useful monomers include vinyl acetate and vinylpropionate.

Besides the aforementioned homopolymers and copolymers, the electrocoating bath compositions of the present invention also contain, as a main film-forming polymer, an ionic, preferably cationic, electrodepositable resin. A wide variety of electrodepositable film-forming polymers are known and can be used in the electrodepositable coating compositions of the invention so long as the polymers are "water dispersible," i.e., adapted to be solubilized, dispersed or emulsified in water. The water dispersible polymer is ionic in nature, that is, the polymer will contain anionic functional groups to impart a negative charge or, as is preferred, cationic functional groups to impart a positive charge.

Examples of film-forming resins suitable for use in anionic electrodepositable coating compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference. Other acid functional polymers can also be used such as phosphatized polyepoxide or phosphatized acrylic polymers as are well known to those skilled in the art.

As aforementioned, it is preferred that the ionic electrodepositable resin (a) is capable of deposition on a cathode. Examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, film-forming resins which cure via transesterification such as described in European Application No. 12463 can be used. Further, cationic compositions prepared from Mannich bases such as described in U.S. Pat. No. 4,134,932 can be used.

The resins to which the present invention is particularly effective are those positively charged resins which contain primary and/or secondary amine groups. Such resins are described in U.S. Pat. Nos. 3,663,389; 3,947,339; and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

The ionic electrodepositable resin described above is present in the electrocoating composition in amounts of about 1 to about 60 percent by weight, preferably about 5 to about 25 based on total weight of the electrodeposition bath.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. The polymer is typically present in the resinous phase in an amount of from about 0.1 to about 10 percent, preferably from about 0.1 to about 2 percent by weight based on total weight of the resinous phase. When the compositions of the present invention are in the form of resin concentrates, they generally have a resin solids content of about 20 to about 60 percent by weight based on weight of the aqueous dispersion.

Electrodeposition baths are typically supplied as two components: (1) a clear resin feed, which includes generally the ionic electrodepositable resin, i.e., the main film-forming polymer, and/or crosslinker and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

It should be appreciated that there are various methods by which the polymer can be incorporated into the electrodeposition bath. The polymer may be added "neat," that is, added directly to the bath without prior blending or reacting with other components. Alternately, the polymer can be added to the predispersed clear resin feed which may include the ionic resin, the crosslinker and/or any other non-pigmented component. The polymer can also be pre-blended with the pigment paste component prior to the incorporation of the paste to the electrodeposition bath. Preferably, the polymer is added to the predispersed clear resin feed or is pre-blended with the pigment paste component.

The resin solids content of the electrodeposition bath are usually within the range of about 5 to 25 percent by weight based on total weight of the electrodeposition bath.

As aforementioned, the polymer is present in the electrodeposition bath compositions of the invention in an amount effective to abate formation of defects caused by the contaminants found in the deposited coating surface. Typically, the polymer is present in an amount of about 0.1 to about 10 weight percent, preferably about 0.1 to about 6 weight percent, and even more preferably from about 0.1 to about 2 weight percent based on weight of total resin solids in the electrodeposition bath composition.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

When the aqueous dispersions as described above are employed for use in electrodeposition, the aqueous dispersion is placed in contact with an electrically conductive anode and an electrically conductive cathode, with the surface to be coated being the cathode in cationic electrodeposition and the anode in anionic electrodeposition. As aforementioned, in the method of the present invention, it is preferred that the substrate serves as the cathode. Following contact with the aqueous dispersion, an adherent film of the coating composition is deposited on the substrate which is serving as an electrode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film. The electrodepositable coating compositions of the present invention can be applied to a variety of electroconductive substrates especially metals such as steel, aluminum, copper, magnesium and conductive carbon coated materials.

After the coating has been applied by electrodeposition, it is cured usually by baking at elevated temperatures such as about 90° to about 260° C. for about 1 to about 40 minutes.

Illustrating the invention are the following examples which, however, are not to be considered as limiting the invention to their details. All parts and percentages in the following examples as well as throughout the specification are by weight unless otherwise indicated.

EXAMPLES

Comparative Example A describes the preparation of a cationic electrodeposition bath composition which contains no crater control agent. Examples B-1 through B-8 describe the preparation of cationic electrodeposition bath compositions as described in Example A which each contain a polyvinylpyrrolidone or a vinyl pyrrolidone copolymer of varying molecular weights as crater control agents. Oil spot resistance test results for Examples A and B-1 through B-8 are reported in Table 1. Comparative Example C describes the preparation of an anionic electrocoating bath composition which contains no crater control agent. Example D describes the preparation of an anionic electrocoating bath containing the composition of Example A which further includes a polyvinylpyrrolidone as a crater control agent. Oil spot resistance test results for Examples C and D are reported in Table 2.

Example A (Comparative)

This comparative example describes the preparation of a cationic electrodeposition bath containing no homopolymer or copolymer of vinyl pyrrolidone. The electrodeposition bath composition was prepared from a mixture of the following ingredients:

| INGREDIENTS | Parts by weight |
|---|---|
| Cationic epoxy resin[1] | 936.0 |
| Co-resin 1[2] | 47.0 |
| Plasticizer[3] | 12.6 |
| Pigment paste[4] | 124.2 |
| Deionized water | 1,280.0 |

[1] A cationic epoxy based resin prepared with a blocked polyisocyanate crosslinker as described in Example VIIID of U.S. Pat. No. 5,767,191. The resin had a final resin solids content of 44.7%.
[2] A cationic resin prepared as generally described in Examples A and B of U.S. Pat. No. 5,096,556, except that acetic acid instead of lactic acid was used to disperse the soap of Example A, and ethylene glycol butyl ether instead of methyl isobutyl ketone was used as the solvent in the soap of Example A; and EPON 828 solution was added after rather than before the stripping step in Example B. The resin had a final solids content of 18%.
[3] The reaction product of 2 moles of diethylene glycol butyl ether and 1 mole of formaldehyde, prepared as generally described in U.S. Pat. No. 4,891,111.
[4] A pigment paste commercially available as E6215 from PPG Industries, Inc.

The electrocoating bath composition of Example A was prepared in the following manner. The plasticizer was added under moderate agitation to Co-resin 1 and mixed for approximately 10 minutes. The resulting mixture was diluted with 20% by weight of the total deionized water and the solution was then added to the cationic epoxy resin under agitation. The pigment paste was diluted with 10% by weight of the total deionized water and added to the thinned resin mix. The remaining amount of water was then added to the resin/paste admix to yield an electrocoating bath composition having a total solids content of approximately 20% and a pigment-to-binder ratio of 0.14:1. The bath was subsequently ultrafiltered, removing 20% of the total weight of the bath as ultrafiltrate, and the ultrafiltrate was replaced with fresh deionized water.

Example B-1 to B-8

This example describes the preparation of eight cationic electrocoating bath compositions which contain polyvinylpyrrolidone and vinyl pyrrolidone copolymers of various molecular weights as crater control agents. These various electrocoating bath compositions were prepared as described in Example A except that the polyvinylpyrrolidone and vinyl pyrrolidone copolymers were each diluted to 10% solids by weight with deionized water, and added to the thinned resin/paste admixture. The electrocoating bath compositions containing the crater control agents were ultrafiltered as described in Example A.

| EXAMPLE | CRATER CONTROL AGENT | Weight of 10% Solution Added to Bath (grams) | Molecular Weight (Mw) |
| --- | --- | --- | --- |
| B-1 | PVP K120[1] | 44 | 960,000 |
| B-2 | PVP K-90[1] | 172 | 450,000 |
| B-3 | PVP K-60[1] | 557 | 140,000 |
| B-4 | PVP K-15[1] | 518 | 1,400 |
| B-5 | GANEX P904[2] | 346 | (not available) |
| B-6 | POLECTRON 430[3] | 346 | 13,000 |
| B-7 | STYLEZE CC-10[4] | 17.3 | 400,000 |
| B-8 | PVP-DMAEMA[5] | 25.9 | 740,000 |

[1]Polyvinylpyrrolidone having respective molecular weights (Mw) listed, available from International Specialty Products.
[2]Copolymer of 90% polyvinylpyrrolidone/10% 1-butenyl substituent, available from International Specialty Products.
[3]Copolymer of 70% polyvinylpyrrolidone/30% styrene, available from International Specialty Products.
[4]Copolymer of vinyl pyrrolidone and dimethylaminopropylmethacrylamide, available from International Specialty Products
[5]Copolymer of vinyl pyrrolidone and dimethylaminoethylmethacrylate, available from Adlrich Chemical Co.

Example C (Comparative)

This comparative example describes the preparation of an anionic electrocoating bath composition which contains no crater control agent. The electrocoating bath composition was prepared from a mixture of the following ingredients:

| INGREDIENTS | Weight (grams) |
| --- | --- |
| AR 210[1] | 154.6 |
| AP 274[2] | 85.3 |
| Deionized water | 1,760.0 |

[1]Resin feed component of an anionic acrylic electrocoating composition commercially available from PPG Industries, Inc. as POWERCRON ® 210.
[2]Pigment paste component of an anionic acrylic electrocoating composition commercially available from PPG Industries, Inc. as POWERCRON ® 210.

Under moderate agitation, 50 grams of the deionized water were added to the AP274 pigment paste, which admixture was then added to the AR210 resin component. The remaining water was added to this resin/paste admixture to yield an anionic electrodeposition bath having a total solids content of approximately 9 percent and a 0.44:1 pigment-to-binder ratio.

Example D

This example describes the preparation of an anionic electrocoating bath composition which contains polyvinylpyrrolidone as a crater control agent. The bath was prepared by adding a solution of 0.37 grams PVP K-120 in 3.33 grams deionized water (a 10% solution) to the anionic electrocoating bath composition of Example C.

ELECTROCOATING PROCEDURE:

Each of the above-described electrocoating bath compositions were electrodeposited onto a cold rolled steel panel which had been previously pretreated with a zinc phosphate pretreatment followed by a deionized water rinse, commercially available as C700/DI from Chemfil Corporation Conditions for cationic electrodeposition for the above described cationic coating compositions of Examples A and B-1 through B-8 were 2 minutes at 85° F. at 275 volts to yield a film thickness of about 0.7 to 0.9 mils. These electrocoated films were subsequently cured at 340° F. for 30 minutes.

Conditions for anionic electrodeposition for the anionic coating compositions of Examples C and D were 90 seconds at 90° F. at 115 volts to yield a cured film thickness of about 0.7 to 0.9 mils. These electrocoated substrates were cured at a temperature of 300° F. for 20 minutes.

TESTING PROCEDURE:

Oil spot contamination resistance testing evaluates the ability of an electrodeposited coating to resist crater formation upon cure. Films were tested for oil spot resistance by contamination with oils typically used for chain lubrication in automobile assembly plants. For both the anionic and cationic electrodepositable coating compositions of Examples A, B-1 to B-8, C, and D, the top half of a C700/DI phosphated steel panel was spotted with TRIBOL-ICO medium oil and the bottom half was spotted with LUBE-CON ATS oil. The oil-spotted test panels were then electrocoated and cured as described above for the respective cationic and anionic electrodepositable coating compositions.

Oil spot test results for the cationic electrocoating bath compositions of Examples A and B-1 to B-8 are reported in the following Table 1. Oil spot test results for the anionic electrocoating bath compositions of Examples C and D are reported in the following Table 2.

TABLE I

| EXAMPLE | Oil Spot Resistance* |
| --- | --- |
| B-1 | 4 |
| B-2 | 3 |
| B-3 | 2–3 |
| B-4 | 2–3 |
| B-5 | 3 |
| B-6 | 3 |
| B-7 | 6 |
| B-8 | 5–6 |
| A (Comparative) | 2–3 |

*10 best, 0 worst

The test results reported in Table 1 illustrate that the vinyl pyrrolidone homopolymers and copolymers are effective as crater control agents in electrocoating bath compositions. Particularly effective are those that have a weight average molecular weight greater than 200,000.

TABLE 2

| EXAMPLE | Oil spot resistance* |
| --- | --- |
| D | 8–9 |
| C (Comparative) | 6–7 |

*10 best, 0 worst

The test results reported in Table 2 illustrate that the polyvinylpyrrolidone, PVP-K-120, exhibits even greater effectiveness as a crater control agent in anionic electrocoating bath compositions when compared with an anionic bath composition containing no crater control agent.

We claim:

1. An aqueous electrocoating bath composition comprising a resinous phase dispersed in an aqueous medium, said resinous phase containing an ionic resin capable of deposition on a substrate serving as an electrode in an electrical circuit to form a substantially continuous coating thereon, said bath including contaminants capable of forming defects in a surface of the coating deposited on said substrate, the bath also including a polymer prepared from the polymerization of a polymerizable, ethylenically unsaturated monomer having a heterocyclic ring containing at least one ring nitrogen atom bonded to a vinyl group or a mixture of monomers comprising a polymerizable, ethylenically unsaturated monomer having a heterocyclic ring containing at least one ring nitrogen atom bonded to a vinyl group, wherein said polymer is present in an amount effective to abate formation of defects caused by the contaminants in the deposited coating surface.

2. The electrocoating bath composition of claim 1 wherein said polymer is a homopolymer.

3. The electrocoating bath composition of claim 2 wherein said polymer is polyvinylpyrrolidone.

4. The electrocoating bath composition of claim 3 wherein the polyvinylpyrrolidone has a weight average molecular weight of at least 200,000.

5. The electrocoating bath composition of claim 2 wherein said polymer is polycaprolactam.

6. The electrocoating bath composition of claim 5, wherein the polyvinylcaprolactam has a weight average molecular weight of at least 200,000.

7. The electrocoating bath composition of claim 1 wherein said polymer is a copolymer prepared from the polymerization of
   (a) a polymerizable, ethylenically unsaturated monomer having a heterocyclic ring containing at least one ring nitrogen atom bonded to a vinyl group; and
   (b) a polymerizable, ethylenically unsaturated monomer different from (a).

8. The electrocoating bath composition of claim 7 wherein the monomer (a) is vinyl pyrrolidone.

9. The electrocoating bath composition of claim 7 wherein the monomer (a) is vinyl caprolactam.

10. The electrocoating bath composition of claim 7 wherein the monomer (b) is selected from the group consisting of olefins, vinyl aromatic compounds, alkyl esters of (meth)acrylic acid and ethylenically unsaturated compounds having amide functionality.

11. The electrocoating bath composition of claim 7 wherein the monomer (a) is vinyl pyrrolidone and the monomer (b) is selected from the group consisting of 1-butene, styrene, dimethylaminoethyl (meth)acrylate, vinyl caprolactam, and dimethylaminopropyl (meth)acrylamide.

12. The electrocoating bath composition of claim 7 wherein the polymer has a weight average molecular weight of at least 200,000.

13. The electrocoating bath composition of claim 1 wherein the ionic electrodepositable resin is capable of deposition on a cathode.

14. The electrocoating bath composition of claim 1 wherein the polymer is present in an amount ranging from 0.1 to 10 weight percent based on the weight of total resin solids in the electrocoating bath composition.

15. A method of reducing surface defects in electrodeposited films on an electrically conductive substrate comprising the steps of
   (a) immersing the substrate serving as a charged electrode and an oppositely charged electrode in an aqueous electrocoating bath composition comprising a resinous phase dispersed in an aqueous medium, said resinous phase containing an ionic resin capable of deposition on the substrate serving as an electrode in an electrical circuit, said bath including contaminants capable of forming defects in a surface of the coating deposited on said substrate, the bath also including a polymer prepared from the polymerization of a polymerizable, ethylenically unsaturated monomer having a heterocyclic ring containing at least one ring nitrogen atom bonded to a vinyl group or a mixture of monomers comprising a polymerizable, ethylenically unsaturated monomer having a heterocyclic ring containing at least one ring nitrogen atom bonded to a vinyl group, wherein said polymer is present in an amount effective to abate formation of defects caused by the contaminants in the deposited coating surface;
   (b) connecting the substrate as an electrode in an electrical circuit;
   (c) depositing a substantially continuous film on the substrate by passing direct current between the electrodes to cause the deposition of the electrocoating composition on the substrate;
   (d) removing the coated substrate from the electrocoating bath; and
   (e) baking the deposited film to provide a coating substantially free of surface defects caused by contaminants.

16. The method of claim 15 wherein the polymer is a homopolymer.

17. The method of claim 16 wherein the polymer is polyvinylpyrrolidone.

18. The method of claim 17 wherein the polyvinylpyrrolidone has a weight average molecular weight of at least 200,000.

19. The method of claim 16 wherein the polymer is polyvinylcaprolactam.

20. The method of claim 19 wherein the polyvinylcaprolactam has a weight average molecular weight of at least 200,000.

21. The method of claim 15 wherein the polymer is a copolymer prepared from the polymerization of
   (a) a polymerizable, ethylenically unsaturated monomer having a heterocyclic ring containing at least one ring nitrogen atom bonded to a vinyl group; and
   (b) a polymerizable, ethylenically unsaturated monomer different from (a).

22. The method of claim 21 wherein the monomer (a) is vinyl pyrrolidone.

23. The method of claim 21 wherein the monomer (a) is vinyl caprolactam.

24. The method of claim 21 wherein the monomer (b) is selected from the group consisting of olefins, vinyl aromatic compounds, alkyl esters of (meth)acrylic acid and ethylenically unsaturated compounds having amide functionality.

25. The method of claim 21 wherein (a) is vinyl pyrrolidone and the monomer (b) is selected from the group consisting of 1-butene, styrene, dimethylaminoethyl (meth)acrylate, vinylcaprolactam, and dimethylaminopropyl (meth)acrylamide.

26. The method of claim 15 wherein the polymer has a weight average molecular weight of at least 200,000.

27. The method of claim 15 wherein the ionic electrodepositable resin is capable of deposition on a cathode.

28. The method of claim 15 wherein the polymer is present in an amount ranging from 0.1 to 10 weight percent based on the weight of total resin solids in the electrocoating bath composition.

* * * * *

(12) EX PARTE REEXAMINATION CERTIFICATE (4925th)
United States Patent
Kaylo et al.

(10) Number: US 6,132,581 C1
(45) Certificate Issued: Apr. 6, 2004

(54) ELECTROCOATING COMPOSITIONS CONTAINING POLYVINYLPYRROLIDONE CRATER CONTROL AGENTS

(75) Inventors: Alan J. Kaylo, Glenshaw, PA (US); Thor G. Lingenfelter, Evans City, PA (US)

(73) Assignee: PPG Industries, Inc., Cleveland, OH (US)

Reexamination Request:
No. 90/005,988, Apr. 24, 2001

Reexamination Certificate for:
Patent No.: 6,132,581
Issued: Oct. 17, 2000
Appl. No.: 09/298,101
Filed: Apr. 22, 1999

(51) Int. Cl.$^7$ .......................... C25D 15/00; C08L 23/00
(52) U.S. Cl. .................. 204/489; 204/493; 204/500; 524/502; 524/543
(58) Field of Search ................................ 204/489, 493, 204/500; 524/502, 543

(56) References Cited

U.S. PATENT DOCUMENTS 5,600,044 A * 2/1997 Colle et al. .................. 585/15

FOREIGN PATENT DOCUMENTS

EP        0 358 221 A2     9/1990

* cited by examiner

Primary Examiner—James J. Seidleck

(57) ABSTRACT

Disclosed are electrodepositable coating compositions containing a polymer prepared from the polymerization of an ethylenically unsaturated monomer having a heterocyclic ring containing at least one ring nitrogen atom bonded to a vinyl group or a mixture of monomers comprised of such a monomer, the compositions further including contaminants capable of forming defects in the electrodeposited coating surface. The polymer is present in an amount effective to abate formation of the surface defects caused by the contaminants. A method of electrocoating a conductive substrate using the electrodepositable coating compositions of the invention is also disclosed.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 6, 11–12, 19–20, 25 and 26 are cancelled.

Claims 1, 5, 7, 10, 15, 21 and 24 are determined to be patentable as amended.

Claims 2–3, 8–9, 13–14, 16–18, 22–23 and 27–28, dependent on an amended claim, are determined to be patentable.

1. An aqueous electrocoating bath composition comprising a resinous phase dispersed in an aqueous medium, said resinous phase containing an ionic resin capable of deposition on a substrate serving as an electrode in an electrical circuit to form a substantially continuous coating thereon, said bath including contaminants capable of forming defects in a surface of the coating deposited on said substrate, the bath also including a polymer *selected from the group consisting of a homopolymer selected from at least one of polyvinylpyrrolidone and polyvinylcaprolactam, and a copolymer* prepared from the polymerization of a polymerizable, ethylenically unsaturated monomer having a heterocyclic ring containing at least one ring nitrogen atom bonded to a vinyl group [or a mixture of monomers comprising a polymerizable, ethylenically unsaturated monomer having a heterocyclic ring containing at least one ring nitrogen atom bonded to a vinyl group], *and an aminoalkyl(meth)acrylamide monomer*, said polymer having a weight average molecular weight of at least 200,000, wherein said polymer is present in an amount effective to abate formation of defects caused by the contaminants in the deposited coating surface.

5. The electrocoating bath composition of claim 2 wherein said polymer is [polycaprolactam] *polyvinylcaprolactam*.

7. The electrocoating bath composition of claim 1 wherein said polymer is a copolymer prepared from the polymerization of (a) a polymerizable, ethylenically unsaturated monomer having a heterocyclic ring containing at least one ring nitrogen atom bonded to a vinyl group; and (b) [a polymerizable, ethylenically unsaturated monomer different from (a)] *an aminoalkyl(meth)acrylamide*.

10. The electrocoating bath composition of claim 7 wherein the monomer (b) is selected from the group consisting of [olefins, vinyl aromatic compounds, alkyl esters of (meth)acrylic acid and ethylenically unsaturated compounds having amide functionality] *dimethylaminopropyl(meth)acrylamide, N-hydroxyethylacrylamide, and N-dimethylaminoethanolacrylamide*.

15. A method of reducing surface defects in electrodeposited films on an electrically conductive substrate comprising the steps of (a) immersing the substrate serving as a charged electrode and an oppositely charged electrode in an aqueous electrocoating bath composition comprising a resinous phase dispersed in an aqueous medium, said resinous phase containing an ionic resin capable of deposition on the substrate serving as an electrode in an electrical circuit, said bath including contaminants capable of forming defects in a surface of the coating deposited on said substrate, the bath also including a polymer *selected from the group consisting of a homopolymer selected from at least one of polyvinylpyrrolidone and polyvinylcaprolactam, and a copolymer* prepared from the polymerization of a polymerizable, ethylenically unsaturated monomer having a heterocyclic ring containing at least one ring nitrogen atom bonded to a vinyl group [or a mixture of monomers comprising a polymerizable, ethylenically unsaturated monomer having a heterocyclic ring containing at least one ring nitrogen atom bonded to a vinyl group] *and an aminoalkyl(meth)acrylamide monomer*, said polymer having a weight average molecular weight of at least 200,000, wherein said polymer is present in an amount effective to abate formation of defects caused by the contaminants in the deposited coating surface;

(b) connecting the substrate as an electrode in an electrical circuit;

(c) depositing a substantially continuous film on the substrate by passing direct current between the electrodes to cause the deposition of the electrocoating composition of the substrate;

(d) removing the coated substrate from the electrocoating bath; and (e) baking the deposited film to provide a coating substantially free of surface defects caused by contaminants.

21. The method of claim 15 wherein the polymer is a copolymer prepared from the polymerization of (a) a polymerizable, ethylenically unsaturated monomer having a heterocyclic ring containing at least one ring nitrogen atom bonded to a vinyl group; and (b) [a polymerizable, ethylenically unsaturated monomer different from (a)] *an aminoalkyl(meth)acrylamide monomer*.

24. The method of claim 21 wherein the monomer (b) is selected from the group consisting of [olefins, vinyl aromatic compounds, alkyl esters of (meth)acrylic acid and ethylenically unsaturated compounds having amide functionality] *dimethylaminopropyl(meth)acrylamide, N-hydroxyethylacrylamide, and N-dimethylaminoethanolacrylamide*.

* * * * *